United States Patent
Buschka et al.

(10) Patent No.: US 11,951,527 B2
(45) Date of Patent: Apr. 9, 2024

(54) METHOD FOR PRODUCING A BALL RACEWAY ON A WORKPIECE AND A BALL SCREW NUT HAVING A BALL RACEWAY THUS PRODUCED

(71) Applicant: Schaeffler Technologies AG & Co. KG, Herzogenaurach (DE)

(72) Inventors: Martin Buschka, Herzogenaurach (DE); Peter Geschwindner, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 316 days.

(21) Appl. No.: 17/299,080

(22) PCT Filed: Nov. 8, 2019

(86) PCT No.: PCT/DE2019/100965
§ 371 (c)(1),
(2) Date: Jun. 2, 2021

(87) PCT Pub. No.: WO2020/119849
PCT Pub. Date: Jun. 18, 2020

(65) Prior Publication Data
US 2022/0062969 A1 Mar. 3, 2022

(30) Foreign Application Priority Data
Dec. 10, 2018 (DE) .............. 10 2018 131 508.2

(51) Int. Cl.
*B21H 3/08* (2006.01)
*F16H 25/22* (2006.01)
*F16H 25/24* (2006.01)

(52) U.S. Cl.
CPC .............. *B21H 3/08* (2013.01); *F16H 25/22* (2013.01); *F16H 2025/2481* (2013.01)

(58) Field of Classification Search
CPC ... F16H 25/22; F16H 2025/2481; B21H 3/08; B21H 3/02
See application file for complete search history.

(56) References Cited

U.S. PATENT DOCUMENTS 6,334,370 B1 * 1/2002 Sonoda ................ B21H 3/08
470/25

FOREIGN PATENT DOCUMENTS

| CN | 1533485 A | 9/2004 |
|---|---|---|
| DE | 102005051908 B3 | 1/2007 |
| DE | 102014225104 A1 | 6/2016 |
| EP | 0985470 A2 | 3/2000 |
| JP | S6316827 A | 1/1988 |
| JP | H07251230 A | 10/1995 |
| JP | 2001009637 A | 1/2001 |

(Continued)

*Primary Examiner* — Moshe Wilensky

(57) ABSTRACT

A method for producing a ball raceway on a workpiece includes providing the workpiece, machining a preliminary thread profile on the workpiece and providing a thread rolling tool. The thread rolling tool has a tool shank, and the tool shank has a free end with a tool head having a roller profile. The method also includes clamping the workpiece into the thread rolling tool, rotating the workpiece about an axis of rotation, moving the tool shank longitudinally along the workpiece, and rolling the roller profile on the preliminary thread profile to generate a final thread profile.

10 Claims, 2 Drawing Sheets

(56) References Cited

FOREIGN PATENT DOCUMENTS

| | | | |
|---|---|---|---|
| JP | 4230020 | B2 | 2/2009 |
| JP | 2013166173 | A | 8/2013 |
| JP | 6013656 | B1 | 10/2016 |
| JP | 6100964 | B1 | 3/2017 |

* cited by examiner

METHOD FOR PRODUCING A BALL RACEWAY ON A WORKPIECE AND A BALL SCREW NUT HAVING A BALL RACEWAY THUS PRODUCED

CROSS-REFERENCE TO RELATED APPLICATIONS

This application is the United States National Phase of PCT Appln. No. PCT/DE2019/100965 filed Nov. 8, 2019, which claims priority to German Application No. DE102018131508.2 filed Dec. 10, 2018, the entire disclosures of which are incorporated by reference herein.

TECHNICAL FIELD

The present disclosure relates to a method for producing a ball raceway on a workpiece. The present disclosure also relates to a ball screw nut having a ball raceway produced in this manner.

BACKGROUND

DE 10 2014 225 104 A1 discloses a method for producing a steering rack which has a toothed portion with steering toothing and a spindle portion with a ball screw. First, a rod-like blank made of a solid metal material is provided. The spindle portion is hollowed out by deep-hole drilling on one side, wherein a deep blind hole is produced which protrudes axially through the spindle portion. The ball screw is then produced on the hollow spindle portion by machining.

SUMMARY

The present disclosure further develops a method for producing a ball raceway for a workpiece, e.g., for a ball screw nut.

In a method according to the disclosure for producing a ball raceway on a workpiece, a preliminary thread profile with a first raceway geometry is formed on the workpiece by means of a machining method, and the preliminary thread profile is provided for reworking and formation of a final thread profile. After machining, the workpiece is clamped into a thread rolling tool with a tool shank, and a tool head with a roller profile is formed at a free end of the tool shank. The workpiece is set in rotation about an axis of rotation and the tool shank is moved longitudinally along the workpiece, and the roller profile of the tool head rolls on the workpiece with a second raceway geometry on the preliminary thread profile in order to generate the final thread profile. In other words, the final thread profile is formed from the preliminary thread profile by guiding the roller profile along the preliminary thread profile one or more times. The rolling or rolling off of the roller profile along the preliminary thread profile results in plastic deformation on the surface of the preliminary thread profile, and roughness peaks are smoothed out on the surface of the preliminary thread profile. By reworking or smoothing of roughness peaks, the surface of the preliminary thread profile is reworked in order to thereby form the final thread profile. The final thread profile then corresponds to a final contour of the ball raceway of the workpiece.

The preliminary thread profile has a preliminary raceway quality of the ball raceway, which, in addition to the machining method, can also be produced by means of other alternative methods. Larger tolerances are to be met when producing the preliminary thread profile, so that the preliminary thread profile can be produced in a cost-effective manner. The final contour of the ball raceway is then produced on the workpiece by thread rolling by means of the roller profile. Since a large part of the material of the workpiece has already been removed by the machining process at this point, only reworking or final machining needs to be carried out to create the final quality of the ball raceway.

The roller profile may have a roller profile geometry formed to correspond to the second raceway geometry. In other words, the roller profile is to be understood as a negative profile of the finished ball raceway, with the help of which the final thread profile is produced. The thread rolling tool does not have to apply high torques to generate the final thread profile since the preliminary thread profile has already been created and the roller profile only rolls off along this pre-machined ball raceway in order to produce the final thread profile.

Furthermore, the preliminary thread profile may be formed with a thread pitch. The roller profile has an inclined orientation relative to the axis of rotation of the workpiece, analogously to the thread pitch. In other words, the roller profile has a longitudinal axis which is inclined relative to the axis of rotation of the workpiece such that the roller profile can roll along the preliminary thread profile. Thus, the angle at which the roller profile with its longitudinal axis is inclined relative to the axis of rotation of the workpiece corresponds to the thread pitch of the thread profile.

The workpiece may be hardened after being removed from the thread rolling tool. This increases the resilience of the ball raceway due to targeted changes and transformations in the structure of the workpiece. No further shaping processing is provided here. It is conceivable that, by manually adapting the thread pitch of the thread profile, a geometric distortion of the workpiece from the hardening can be prevented. In other words, the tool shank is provided with longitudinal compensation, by means of which a distortion of the workpiece can be compensated by adapting the thread pitch.

According to a first exemplary embodiment, the tool shank is aligned parallel to the axis of rotation of the workpiece. In other words, the longitudinal axis of the roller profile is also inclined relative to a longitudinal axis of the tool shank.

Alternatively, according to a second exemplary embodiment, the tool shank is inclined with respect to the axis of rotation of the workpiece. In this case, the longitudinal axis of the tool shank as well as the longitudinal axis of the roller profile can be arranged essentially coaxially to one another. The tool shank and the roller profile are therefore jointly inclined by the same angle with respect to the axis of rotation of the workpiece. This simplifies the production of the tool shank.

Furthermore, alternatively, both the rolling profile and the tool shank with their longitudinal axes can be aligned coaxially and parallel to the axis of rotation of the workpiece. In this case, the roller profile has a distorted rolling geometry. In other words, the roller profile is designed such that the roller profile both rolls and slides off the preliminary thread profile during rotation of the workpiece and simultaneous axial movement of the tool shank in order to form the final thread profile. The surface of the preliminary thread profile is thus smoothed in by the roller profile, so to speak partly by grinding and partly by rolling, until the final thread profile with the second raceway geometry is formed.

In all three cases, the tool shank is moved parallel to the axis of rotation of the workpiece to form the final thread profile while the workpiece rotates about the axis of rotation.

The tool shank may be pressed with a pressing force in the direction of the preliminary thread profile. The workpiece is therefore fixed in its position and only rotatable about its own axis of rotation. This creates the final thread profile uniformly on the workpiece. The pressing force can alternatively or additionally be adjusted via a spring force.

The roller profile geometry may be semicircular or formed at least partially in the shape of a Gothic profile with which the final thread profile is produced on the workpiece. This means that the final thread profile can be adapted to the requirements of the workpiece, such as the loads or contact areas that occur. Contact areas are the areas of the ball raceway that come into contact with rolling elements rolling over them during operation.

A ball raceway produced in this manner can be provided, for example, in a ball screw nut for a ball screw drive. The ball raceway is formed on an inner circumferential surface of the ball screw nut. The ball raceway has the final thread profile with a thread pitch.

During the formation of the final thread profile, the workpiece is smoothed in the area of the preliminary thread profile. The first raceway geometry of the preliminary thread profile is expanded or enlarged radially up to the second raceway geometry of the final thread profile. The radial widening or enlarging of the thread profile is only minor, e.g., in the micrometer range. In other words, the roller profile of the tool head has a larger outer diameter than the inner diameter of the preliminary thread profile.

The difference between half the outer diameter, that is to say the radius of the roller profile, and half the inner diameter, that is to say the radius of the preliminary thread profile, is referred to as the smoothing depth. The thickness of the smoothing depth depends on the geometry with which the preliminary thread profile is formed, and on the other hand, on the geometry with which the final thread profile subsequently produced from the preliminary thread profile is formed. Furthermore, the thickness of the smoothing depth depends on the surface quality with which the preliminary thread profile was produced and, accordingly, how the roughness peaks are formed before their plastic deformation.

Accordingly, it is conceivable for the smoothing depth to be constant or variable. With a variable smoothing depth, requirements of the ball screw drive, such as Hertzian pressure, can be taken into account. The greater the smoothing depth, the greater the plastic deformation during the formation of the final thread profile and the greater the solidification of the workpiece in this area. Alternatively, a partially constant and partially variable smoothing depth is also conceivable. In this case, the smoothing depth is optimized for the contact angle. As a result, the ball raceway has a higher resistance to mechanical stresses in the contact areas due to the greater plastic deformation.

BRIEF DESCRIPTION OF THE DRAWINGS

Further measures to improve the disclosure are described below together with a description of three exemplary embodiments using the figures, wherein identical or similar elements are marked with the same reference sign. In the figures.

DETAILED DESCRIPTION

Figure 1:
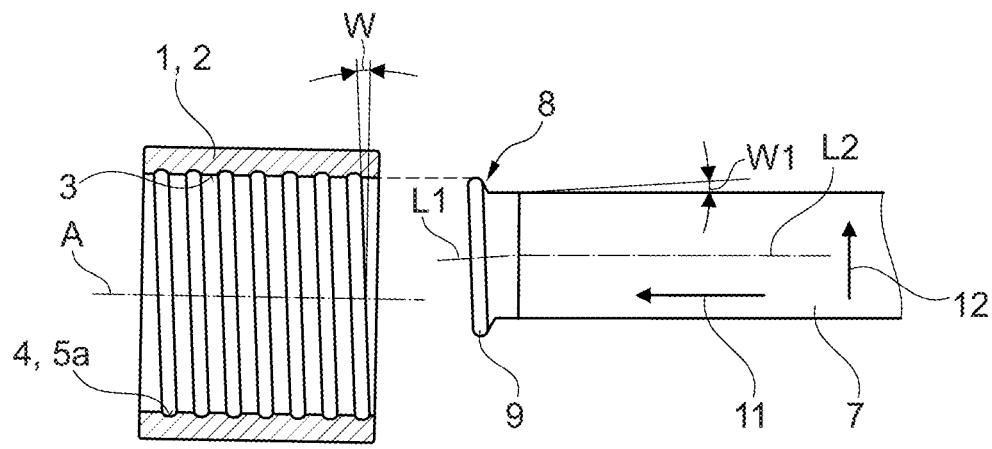
FIG. 1 shows a schematic longitudinal sectional view of a ball screw nut according to the disclosure and a tool shank of a thread rolling tool according to a first exemplary embodiment.
Figure 2:
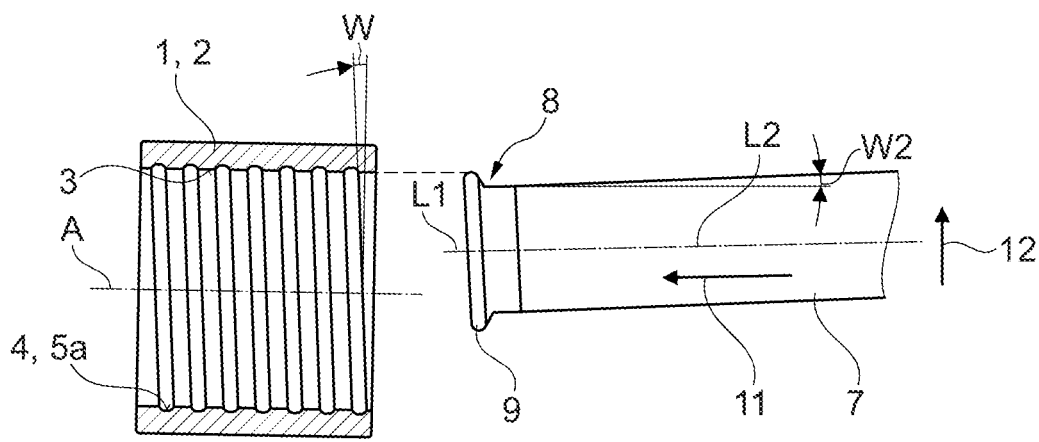
FIG. 2 shows a schematic longitudinal sectional view of the ball screw nut according to the disclosure with the tool shank according to a second exemplary embodiment.
Figure 3:
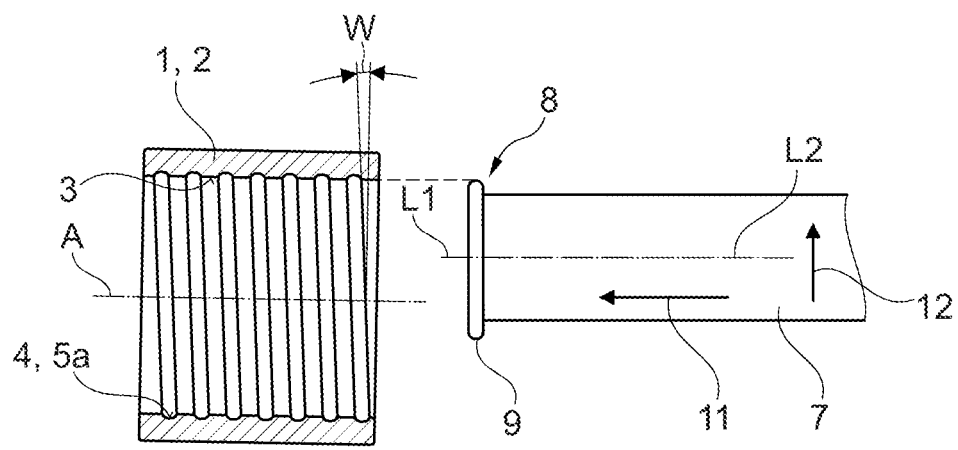
FIG. 3 shows a schematic longitudinal sectional view of the ball screw nut according to the disclosure with the tool shank according to a second exemplary embodiment.

According to FIGS. 1 to 3, three exemplary embodiments of a thread rolling tool—not shown here—are shown. The thread rolling tool has a tool shank 7, at the free end of which a tool head 8 with a roller profile 9 is formed. By means of the roller profile 9, using a method for producing a ball raceway 4 on a workpiece 2, a ball raceway 4 is here produced on a sleeve-shaped ball screw nut 1. In a first method step, a preliminary thread profile 5a is first formed on the workpiece 2 by means of a machining process. In FIGS. 1 to 3, the preliminary thread profile 5a is provided on an inner circumferential surface 3 of the ball screw nut 1 and is intended for reworking and formation of a final thread profile 5b. The preliminary thread profile 5a has a thread pitch W. The formation of the final thread profile 5b is described in more detail below with reference to FIGS. 5a to 5c.

After machining, the workpiece 2 is clamped in the thread rolling tool with the tool shank 7, and the workpiece 2 is set in a rotary movement about an axis of rotation A in a second method step and the tool shank 7 is moved longitudinally along the workpiece 2 in a first movement direction 11 and is passed through the ball screw nut 1. The final thread profile 5b is produced from the preliminary thread profile 5a by rolling the roller profile 9 of the tool head 8 on the preliminary thread profile 5a one or more times. After the formation of the final thread profile 5b, the workpiece 2 is removed from the thread rolling tool and can then optionally be hardened.

The tool shank 7 may be pressed with a pressing force in the direction of the preliminary thread profile 5a. This ensures a uniform introduction of force for the uniform and dimensionally accurate formation of the final thread profile 5b.

According to FIGS. 1 and 2, the roller profile 9 is oriented inclined relative to the axis of rotation A of the workpiece 2, analogously to the thread pitch W. The roller profile 9 therefore has a longitudinal axis L1 which is inclined at an angle W1 which corresponds to the angle of the thread pitch W of the ball raceway 4.

The only difference between the two embodiments according to FIGS. 1 and 2 is that, according to FIG. 1, the tool shank 7 is aligned parallel to the axis of rotation A of the workpiece 2. Thus, the roller profile 9 is also inclined at the angle W1 with respect to a longitudinal axis L2 of the tool shank 7 or the angle of the thread pitch W. In contrast, according to FIG. 2, the tool shank 7 with its longitudinal axis L2 is aligned coaxially to the longitudinal axis L1 of the roller profile 9 so that the tool shank 7, together with the tool head 8 and the roller profile 9, is inclined with respect to the axis of rotation A at an angle W2, which also corresponds to the angle of the thread pitch W of the ball raceway 4.

According to FIG. 3, both the tool shank 7 and the roller profile 9 with their longitudinal axes L1 and L2 are aligned coaxially and parallel to the axis of rotation A of the workpiece 2. The roller profile 9 is designed to be distorted such that the roller profile 9 both rolls and slides over the preliminary thread profile 5a to form the final thread profile 5b.

Figures 4A, 4B:
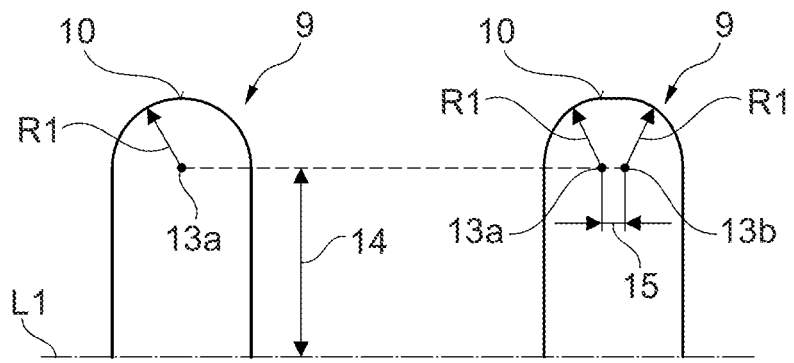
FIG. 4a shows a schematic sectional view of a partially illustrated roller profile of the tool shank according to FIG. 2.
FIG. 4b shows a schematic sectional view of an alternative exemplary embodiment of the partially illustrated roller profile.

In FIGS. 4a and 4b, two possible embodiments of the roller profile 9 are shown. The roller profile 9 is to be understood as a negative profile for the final thread profile 5b. The roller profile 9 thus has a circumferential roller profile geometry 10 which is formed to correspond to a second raceway geometry 6b of the final thread profile 5b, shown in FIGS. 5a to 5b.

According to FIG. 4a, the roller profile geometry 10 is semicircular. This means that the second raceway geometry 6b of the final thread profile 5b is also semicircular during the rolling off of the roller profile 9 along the preliminary thread profile 5a. The roller profile geometry 10 of the roller profile 9 therefore has a center point 13a which is arranged at a radial distance 14 from the longitudinal axis L1 of the roller profile 9. The roller profile geometry 10 is semicircular starting from the center point 13a with a radius R1.

Alternatively, the roller profile geometry 10 according to FIG. 4b is partially formed in the shape of a Gothic profile. This in turn means that the second raceway geometry 6b of the final thread profile 5b is analogously also formed in the shape of a Gothic profile during the rolling off of the roller profile 9 along the preliminary thread profile 5a. The roller profile geometry 10 of the roller profile 9 has a first center point 13a and a second center point 13b, which are each arranged at the same radial distance 14 from the longitudinal axis L1 of the roller profile 9 and are formed spaced apart from one another in the axial direction of the roller profile 9. Starting from the specific center point 13a, 13b, the roller profile geometry 10 is formed with a specific radius R1, R2. The roller profile geometry 10 is set via the radii R1, R2 and the axial distance 15 between the center points 13a, 13b.

Figure 5A:
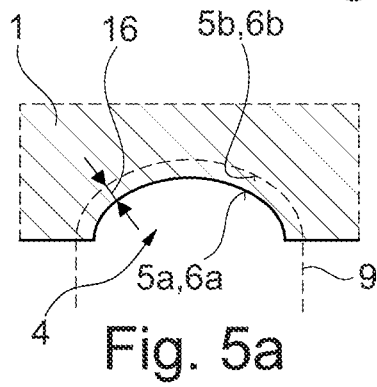
FIG. 5a shows a schematic partial sectional view of a workpiece before a final thread profile is formed, according to the first exemplary embodiment.
Figure 5B:
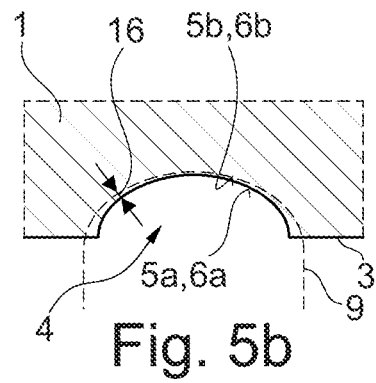
FIG. 5b shows a schematic partial sectional view of a first alternative of the workpiece before the formation of the final thread profile.
Figure 5C:
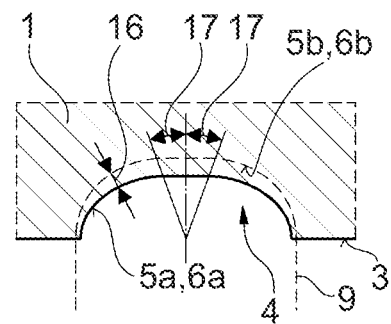
FIG. 5c shows a schematic partial sectional view of a second alternative of the workpiece before a final thread profile is formed.

According to FIGS. 5a, 5b and 5c, three possible embodiments of the thread profile of the ball raceway 4 of the ball screw nut 1 are shown. The solid lines show a first raceway geometry 6a of the preliminary thread profile 5a and the dashed lines show a second raceway geometry 6b of the final thread profile 5b, which is produced by rolling the roller profile 9 along the preliminary thread profile 5a.

By rolling the roller profile 9 along the preliminary thread profile 5a, roughness peaks of the ball raceway 4, for example, are smoothed out, resulting in plastic deformations occurring on the surface of the ball raceway 4. The first raceway geometry 6a is expanded radially up to the second raceway geometry 6b. In other words, the roller profile 9 has a larger outer diameter than the inner diameter of the preliminary thread profile 5a. Furthermore, as shown here with reference to FIGS. 5a to 5c, it is conceivable that the first and second raceway geometries 6a, 6b have different shapes. In other words, there is a cross-sectional area between the two raceway geometries 6a, 6b, which is plastically deformed during rolling off of the roller profile 9 along the preliminary thread profile 5a, so that solidification occurs on the surface of the ball raceway 4 or the final thread profile 5b.

This radial distance between the raceway geometries 6a, 6b is referred to as the smoothing depth 16. According to FIG. 5a, the smoothing depth 16 is constant. In other words, the smoothing depth 16 extends over the semicircular circumference of the ball raceway 4 with a constant thickness.

In FIG. 5b, the smoothing depth 16 is designed to be variable, and the smoothing depth 16 increases from the apex of the ball raceway 4 to the inner circumferential surface 3 of the ball screw nut 1. In other words, when the final thread profile 5b is formed, more material is deformed on the sides of the ball raceway 4 than at the apex, as a result of which higher strengths of the ball raceway 4 are achieved, in particular in the edge region of the ball raceway 4.

According to FIG. 5c, the smoothing depth 16 is partially constant and partly variable, and the smoothing depth 16 is constant in a contact area 17 of the ball raceway 4, i.e., provided with a uniform smoothing depth 16, and then constantly decreases towards the inner circumferential surface 3 of the ball screw nut 1.

REFERENCE NUMERALS

1 Ball screw nut
2 Workpiece
3 Inner circumferential surface
5a Preliminary thread profile
5b Final thread profile
6a First raceway geometry
6b Second raceway geometry
7 Tool shank
8 Tool head
9 Rolled profile
10 Rolled profile geometry
11 First direction of movement
12 Second direction of movement
13a, 13b Center point
14 Distance to the longitudinal axis of the rolled profile
15 Axial distance
16 Smoothing depth
A Axis of rotation
L1 Longitudinal axis of the roller profile
L2 Longitudinal axis of the tool shank
R1 First radius of the roller profile geometry
R2 Second radius of the roller profile geometry
W Thread pitch of the thread profile
W1 Angle of the tool head
W2 Angle of the tool shank

The invention claimed is:
1. A method for producing a ball raceway on a workpiece, comprising:
   providing the workpiece;
   machining a preliminary thread profile on the workpiece;
   providing a thread rolling tool with a tool shank, the tool shank comprising a free end with a tool head having a roller profile;
   clamping the workpiece into the thread rolling tool;
   rotating the workpiece about an axis of rotation;
   moving the tool shank longitudinally along the workpiece; and
   rolling the roller profile on the preliminary thread profile to generate a final thread profile, wherein:
   the preliminary thread profile is formed with a thread pitch; and the roller profile is inclined relative to the axis of rotation, analogously to the thread pitch.

2. The method of claim 1 further comprising:
removing the workpiece from the thread rolling tool; and
hardening the workpiece.

3. The method of claim 1, wherein the tool shank is aligned parallel to the axis of rotation.

4. The method of claim 1, wherein the tool shank is inclined relative to the axis of rotation.

5. The method of claim 1, wherein the tool shank is pressed with a pressing force in a direction of the preliminary thread profile.

6. The method of claim 1, wherein the roller profile comprises a roller profile geometry that is semicircular or at least partially in the shape of a Gothic profile.

7. A method for producing a ball raceway on a workpiece, comprising:
providing the workpiece;
machining a preliminary thread profile on the workpiece;
providing a thread rolling tool with a tool shank, the tool shank comprising a free end with a tool head having a roller profile;
clamping the workpiece into the thread rolling tool;
rotating the workpiece about an axis of rotation;
moving the tool shank longitudinally along the workpiece; and
rolling the roller profile on the preliminary thread profile to generate a final thread profile, wherein the tool shank is inclined relative to the axis of rotation.

8. The method of claim 7 further comprising:
removing the workpiece from the thread rolling tool; and
hardening the workpiece.

9. The method of claim 7, wherein the tool shank is pressed with a pressing force in a direction of the preliminary thread profile.

10. The method of claim 7, wherein the roller profile comprises a roller profile geometry that is semicircular or at least partially in the shape of a Gothic profile.

\* \* \* \* \*